(12) United States Patent
Eickbush et al.

(10) Patent No.: US 12,710,736 B1
(45) Date of Patent: Aug. 18, 2026

(54) GENERATION OF ELECTRICALLY ENABLED, DOUBLY CURVED SURFACES

(71) Applicant: Honeywell Federal Manufacturing & Technologies, LLC, Kansas City, MO (US)

(72) Inventors: Ryan John Eickbush, Lee's Summit, MO (US); Carlos Velez, Miami, FL (US); Jaime Eduardo Regis, Overland Park, KS (US); Jackson Dale White, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 19/442,760

(22) Filed: Jan. 7, 2026

(51) Int. Cl.
*G05B 19/29* (2006.01)
*G05B 19/4099* (2006.01)

(52) U.S. Cl.
CPC ......... *G05B 19/29* (2013.01); *G05B 19/4099* (2013.01)

(58) Field of Classification Search
CPC .. G05B 19/4099; G05B 19/401; G05B 19/29; G05B 19/4097; G05B 2219/35097; G05B 2219/35108; G05B 2219/49005
See application file for complete search history.

(56) References Cited

U.S. PATENT DOCUMENTS 6,311,100 B1 * 10/2001 Sarma ................ G05B 19/4097 700/190
6,498,653 B1 * 12/2002 Wang .................. G01B 11/306 356/498
2002/0120359 A1 * 8/2002 Xi ...................... G05B 19/4097 700/184
2016/0121557 A1 * 5/2016 Munaux ................ B29C 70/382 700/98

(Continued)

FOREIGN PATENT DOCUMENTS

IN 202421033410 4/2024

OTHER PUBLICATIONS

Anshuman Shastri, et al., "3D Printing of Millimetre Wave and Low-Terahertz Frequency Selective Surfaces Using Aerosol Jet Technology", IEEE Access, vol. 8, Oct. 8, 2020.

(Continued)

*Primary Examiner* — Nicholas Klicos
(74) *Attorney, Agent, or Firm* — Erise IP, P.A.

(57) ABSTRACT

Systems, methods, and computer-readable media for generating an electrically enabled, doubly curved surface. A method may include generating a point cloud array associated with a 2-dimensional design of the unit cell design, wherein the point cloud array includes a plurality of points. The method may include determining a polar coordinate for each point of the plurality of points from the point cloud array such that a set of polar coordinates is obtained, determining an absolute value of a radial distance of each (Continued)

polar coordinate from the set of polar coordinates, normalizing the absolute value of the radial distance of each polar coordinate from the set of polar coordinates to obtain a set of normalized polar coordinates, interpolating the set of normalized polar coordinates to obtain the electrically enabled, doubly curved surface, and generating instructions for a tool path of the electrically enabled, doubly curved surface.

20 Claims, 6 Drawing Sheets

(56) References Cited

U.S. PATENT DOCUMENTS

2017/0300029 A1* 10/2017 Oda ....................... G05B 19/19
2018/0120800 A1* 5/2018 Saravanan ....... G05B 19/40938
2023/0103064 A1 3/2023 Valle et al.
2024/0378328 A1* 11/2024 Yigit ....................... G06F 30/12

OTHER PUBLICATIONS

Denise Radkowski, Antenna Research Associates, Slide Deck entitled “Additive Large Area Conformal Electronics Manufacturing”, TechBlick2024, Jun. 13, 2024.
Rana Sadaf Anwar, et al., Frequency Selective Surfaces: a Review, Applied Science. Sep. 18, 2018, doi:10.3390/app8091689, www.mdpi.com/journal/applsci.

* cited by examiner

GENERATION OF ELECTRICALLY ENABLED, DOUBLY CURVED SURFACES

STATEMENT OF GOVERNMENT SUPPORT

This invention was made with government support under contract number DE-NA-0002839, awarded by the United States Department of Energy/National Nuclear Security Administration. The government has certain rights in the invention.

BACKGROUND

1. Field

Embodiments of the present disclosure relate to generating instructions for tool paths for nonplanar surfaces. More specifically, embodiments of the present disclosure relate to the generation of instructions for tool paths for the additive manufacturing of electrically enabled, doubly curved surfaces.

2. Related Art

Frequency-selective surfaces (FSS) are electrically enabled structures that selectively transmit, reflect, or absorb electromagnetic waves at specific frequencies. Nonplanar electrically enabled surfaces, such as frequency-selective, doubly curved surfaces, allow for integration with applications benefiting from surface conformity. Potential use cases for nonplanar electrically enabled surfaces include defense, aerospace, telecommunications, and biomedical domains. However, the design and manufacture of nonplanar electrically enabled surfaces introduce significant computational and practical challenges. Unlike planar electrically enabled surfaces, nonplanar electrically enabled surfaces often require complex modeling that accounts for factors such as surface curvature, angle of incidence variability, and material heterogeneity. These factors increase the burden on conventional simulation and design tools, which are often computationally optimized for flat or uniform substrates.

Modeling across curved geometries typically consumes considerable processing power and time. In addition, translating a nonplanar, electrically enabled surface design into a manufacturable form, particularly via tool path instruction generation for additive manufacturing, requires further computational resources. Conventional computer-aided design (CAD) and computer-aided manufacturing (CAM) tools are not typically equipped to handle translation from CAD design to physical product while minimizing distortion of the physical product, especially for doubly curved surfaces. Accordingly, there exists a need for improved methods and systems for modeling nonplanar electrically enabled surfaces and for efficiently generating associated tool path instructions. Such systems should reduce computational overhead, improve geometric and electromagnetic fidelity by reducing distortion, and streamline the workflow from design to manufacturing, enabling wider deployment of nonplanar, electrically enabled surfaces in practical, real-world applications.

SUMMARY

In some aspects, the techniques described herein relate to a system for generating instructions for a tool path for an electrically enabled, doubly curved surface, the system including: one or more non-transitory computer-readable media storing computer-executable instructions that, when executed by at least one processor, perform a method for generating the instructions for the tool path for the electrically enabled, doubly curved surface, the method including: generating a 2-dimensional design of a unit cell design; generating a point cloud array associated with the 2-dimensional design of the unit cell design, wherein the point cloud array includes a plurality of points; generating the electrically enabled, doubly curved surface associated with the point cloud array, wherein generating the electrically enabled, doubly curved surface includes: determining a polar coordinate for each point of the plurality of points from the point cloud array such that a set of polar coordinates is obtained; determining an absolute value of a radial distance of each polar coordinate from the set of polar coordinates; normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

In some aspects, the techniques described herein relate to a system, further including: a 5-axis printer system operable to print the electrically enabled, doubly curved surface through deposition of a material on a printing surface, wherein the printing surface includes a tool movable about five axes, the tool being at least one of the printing surface or a print head; and wherein the method further includes: executing, via the 5-axis printer system, the instructions for the tool path including an instruction for a movement of the tool.

In some aspects, the techniques described herein relate to a system, wherein the instructions for the tool path further include a shutter-off instruction preventing execution of the instruction for the movement of the tool.

In some aspects, the techniques described herein relate to a system, wherein generating the instructions of the tool path associated with the electrically enabled, doubly curved surface includes: generating the instructions by at least: for each point in a set of points of the electrically enabled, doubly curved surface, generating an instruction to move a tool of a printer system to the point; identifying at least one instruction from the instructions moving the tool of the printer system to a predefined origin point; and responsive to identifying the at least one instruction, overriding the at least one instruction from the instructions.

In some aspects, the techniques described herein relate to a system, wherein overriding the at least one instruction from the instructions includes: removing the at least one instruction from the instructions.

In some aspects, the techniques described herein relate to a system, wherein determining the polar coordinate for each point of the plurality of points includes: determining the radial distance, an azimuth angle, and a polar angle for each point of the plurality of points, wherein each point from the plurality of points is converted to the polar coordinate from a Cartesian coordinate.

In some aspects, the techniques described herein relate to a system, wherein the radial distance for each point of the plurality of points is based on a radial line between said point and an origin point, where the origin point is a center point of the electrically enabled, doubly curved surface.

In some aspects, the techniques described herein relate to one or more non-transitory computer-readable media storing computer-executable instructions that, when executed by at least one processor, perform a method for generating instructions for a tool path for an electrically enabled, doubly curved surface, the method including: generating a 2-dimensional design of a unit cell design, wherein the 2-dimensional design includes a plurality of points along a singular line; generating the electrically enabled, doubly curved surface associated with the 2-dimensional design, wherein generating the electrically enabled, doubly curved surface includes: determining a polar coordinate for each point of the plurality of points from the 2-dimensional design such that a set of polar coordinates is obtained; determining an absolute value of a radial distance of each polar coordinate from the set of polar coordinates; normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

In some aspects, the techniques described herein relate to one or more non-transitory computer-readable media, wherein generating the instructions for the tool path associated with the electrically enabled, doubly curved surface includes: obtaining the instructions by at least: for each point in a set of points of the electrically enabled, doubly curved surface, generating an instruction to at least one of: deposit ink between the point and an adjacent point in the set of points; or move a tool of a printer system to the point.

In some aspects, the techniques described herein relate to one or more non-transitory computer-readable media, wherein generating the instructions for the tool path associated with the electrically enabled, doubly curved surface further includes: identifying at least one instruction from the instructions where the adjacent point is a predefined origin point; and responsive to identifying the at least one instruction, generating a shutter off instruction such that the tool of the printer system is prevented from depositing the ink between the point and the predefined origin point.

In some aspects, the techniques described herein relate to one or more non-transitory computer-readable media, wherein generating the 2-dimensional design of the unit cell design further includes: selectively designing the 2-dimensional design to reflect a predetermined range of frequencies when printed on a nonplanar surface.

In some aspects, the techniques described herein relate to one or more non-transitory computer-readable media, wherein the method further includes: transmitting the instructions for the tool path to a multi-axis printer system, wherein the multi-axis printer system is operable to execute the instructions for the tool path to print the electrically enabled, doubly curved surface on a curved printing surface of the multi-axis printer system.

In some aspects, the techniques described herein relate to one or more non-transitory computer-readable media, wherein the instructions for the tool path include: a shutter-off instruction such that the multi-axis printer system overrides a subsequent instruction based on the shutter-off instruction.

In some aspects, the techniques described herein relate to one or more non-transitory computer-readable media, wherein the subsequent instruction includes a print head of the multi-axis printer system returning to an origin point of the electrically enabled, doubly curved surface.

In some aspects, the techniques described herein relate to a method for generating instructions for a tool path for an electrically enabled, doubly curved surface, the method including: generating a 2-dimensional design of a unit cell design; generating a point cloud array associated with the 2-dimensional design of the unit cell design, wherein the point cloud array includes a plurality of points; generating the electrically enabled, doubly curved surface associated with the point cloud array, wherein generating the electrically enabled, doubly curved surface includes: determining a polar coordinate for each point of the plurality of points from the point cloud array such that a set of polar coordinates is obtained; determining an absolute value of a radial distance of each polar coordinate from the set of polar coordinates; normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

In some aspects, the techniques described herein relate to a method, wherein generating the 2-dimensional design of the unit cell design includes: generating a repeatable pattern of the unit cell design across the 2-dimensional design, wherein the unit cell design is selectively shaped to reflect a predetermined range of frequencies.

In some aspects, the techniques described herein relate to a method, wherein interpolating the set of normalized polar coordinates to obtain the electrically enabled, doubly curved surface includes: performing at least one of linear interpolation or bilinear interpolation of the set of normalized polar coordinates across a sphere.

In some aspects, the techniques described herein relate to a method, further including: wherein a shape of the 2-dimensional design of the unit cell design is selectively chosen for compatibility with one or more tools of a multi-axis printer system, wherein the shape of the 2-dimensional design of the unit cell design is circular.

In some aspects, the techniques described herein relate to a method, wherein the point cloud array is ordered such that an origin point of the point cloud array is a first point in the point cloud array, wherein the origin point is a central point of the 2-dimensional design of the unit cell design.

In some aspects, the techniques described herein relate to a method, further including: printing, via a multi-axis printer system, a plurality of frequency selective surfaces, including the electrically enabled, doubly curved surface based on the instructions for the tool path to obtain a plurality of printed frequency selective surfaces; and coupling the plurality of printed frequency selective surfaces together to form a truncated icosahedron.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, wherein.

Figure 1:
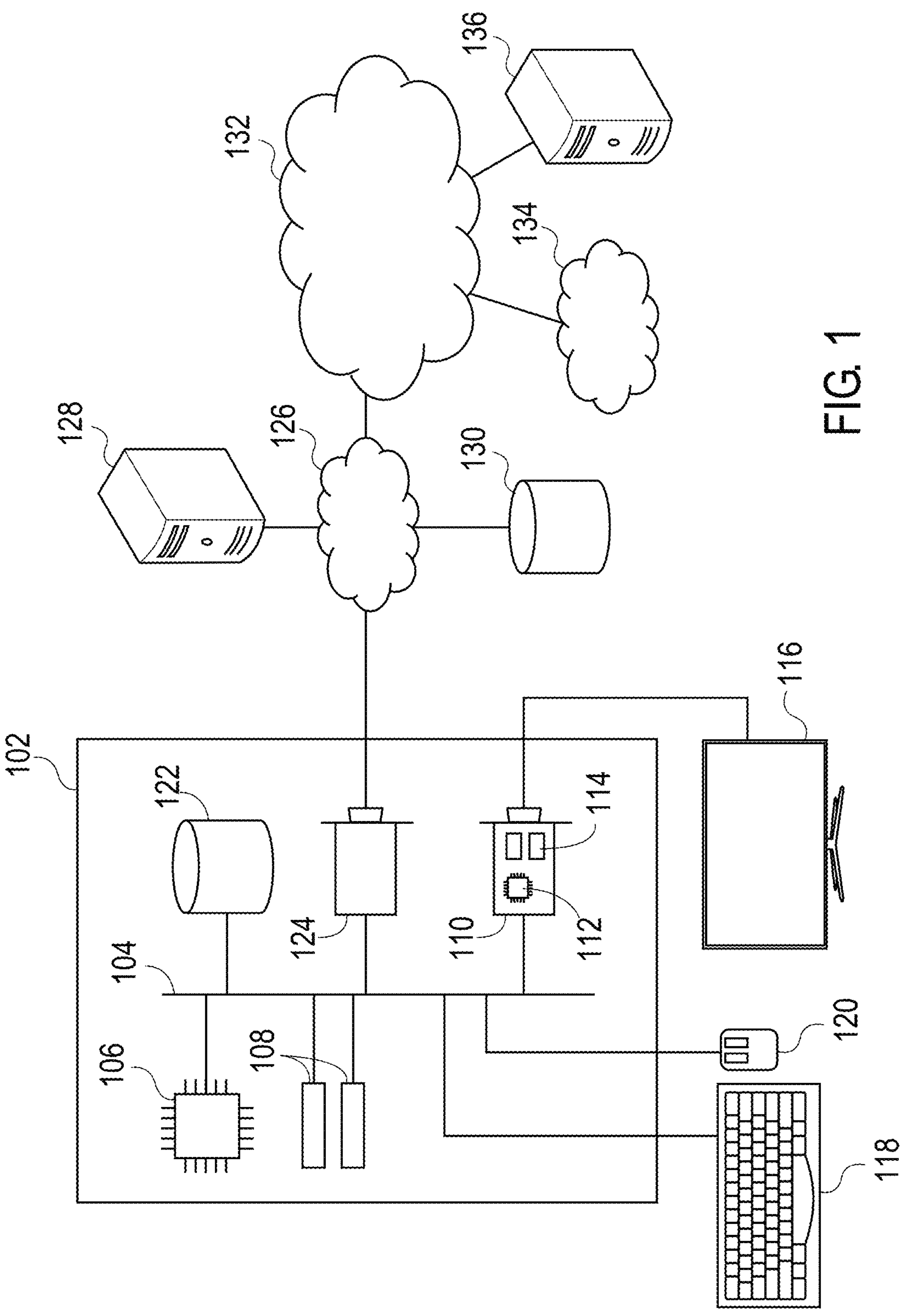
FIG. 1 illustrates an exemplary hardware platform, in accordance with embodiments of the present disclosure.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized and changes can be made without departing from the scope of the present disclosure. The following detailed description is, therefore, not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments of the present disclosure relate to a manufacturing system and corresponding methods for printing an electrically enabled, nonplanar surface. An electrically enabled surface may be a surface selectively designed to exhibit predetermined electrical properties. For example, an electrically enabled surface may have predetermined interactions with certain signals, fields, and charges. In some embodiments, the electrically enabled, nonplanar surface may be a curved frequency selective surface, where the pattern is selectively designed to reflect or absorb a predefined range of frequencies. In some embodiments, the electrically enabled, nonplanar surface may be and/or include an electronic circuit. It is noted herein, however, that the present disclosure is not limited to electrically enabled, nonplanar surfaces and may be extended to nonplanar surfaces that are not electrically enabled.

The manufacturing system includes a multi-axis printer system for printing the electrically enabled, nonplanar surface. For example, the manufacturing system may include a 5-axis aerosol jet printer system for printing the electrically enabled, nonplanar surface on a doubly curved surface through the deposition of a material. A doubly curved surface (e.g., a non-developable surface) may refer to a surface that is unable to be flattened into a plane without distortion.

The manufacturing system includes a modeling system for overlaying 2-dimensional coordinates on an associated 3-dimensional object and generating instructions for a corresponding tool path. The modeling system includes an interpolator. The interpolator may interpolate the 2-dimensional coordinates as mapped on the associated 3-dimensional object. The interpolator may convert the 2-dimensional coordinates as mapped on the associated 3-dimensional object to polar coordinates prior to interpolating. By converting to polar coordinates, the interpolation may minimize the distortion of the 2-dimensional coordinates as overlaid on the 3-dimensional object compared to if interpolation is performed without converting to polar coordinates. Upon interpolation, the electrically enabled, nonplanar surface is obtained.

The modeling system includes a tool path generator. The tool path generator may generate instructions for a tool path associated with the electrically enabled, nonplanar surface. For example, the instructions for tool path may include instructions regarding the movement of one or more components of the printer system, such as a printing surface or a printing head. For example, the instructions for tool path may include instructions regarding the deposition of a material on the printing surface of the printer system to form the electrically enabled, nonplanar surface. One or more instructions of the tool path may be removed or replaced to reduce redundancy in the movement of one or more components of the printer system and thereby increase time and computation efficiency. For example, one or more instructions to move one or more components of the printer system to an origin point of the electrically enabled, nonplanar surface may be removed or replaced.

FIG. 1 illustrates an exemplary hardware platform relating to some embodiments of the present disclosure. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removably attached.

Such non-transitory computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth®, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Electrically Enabled, Nonplanar Surface Manufacturing System

Figure 2:
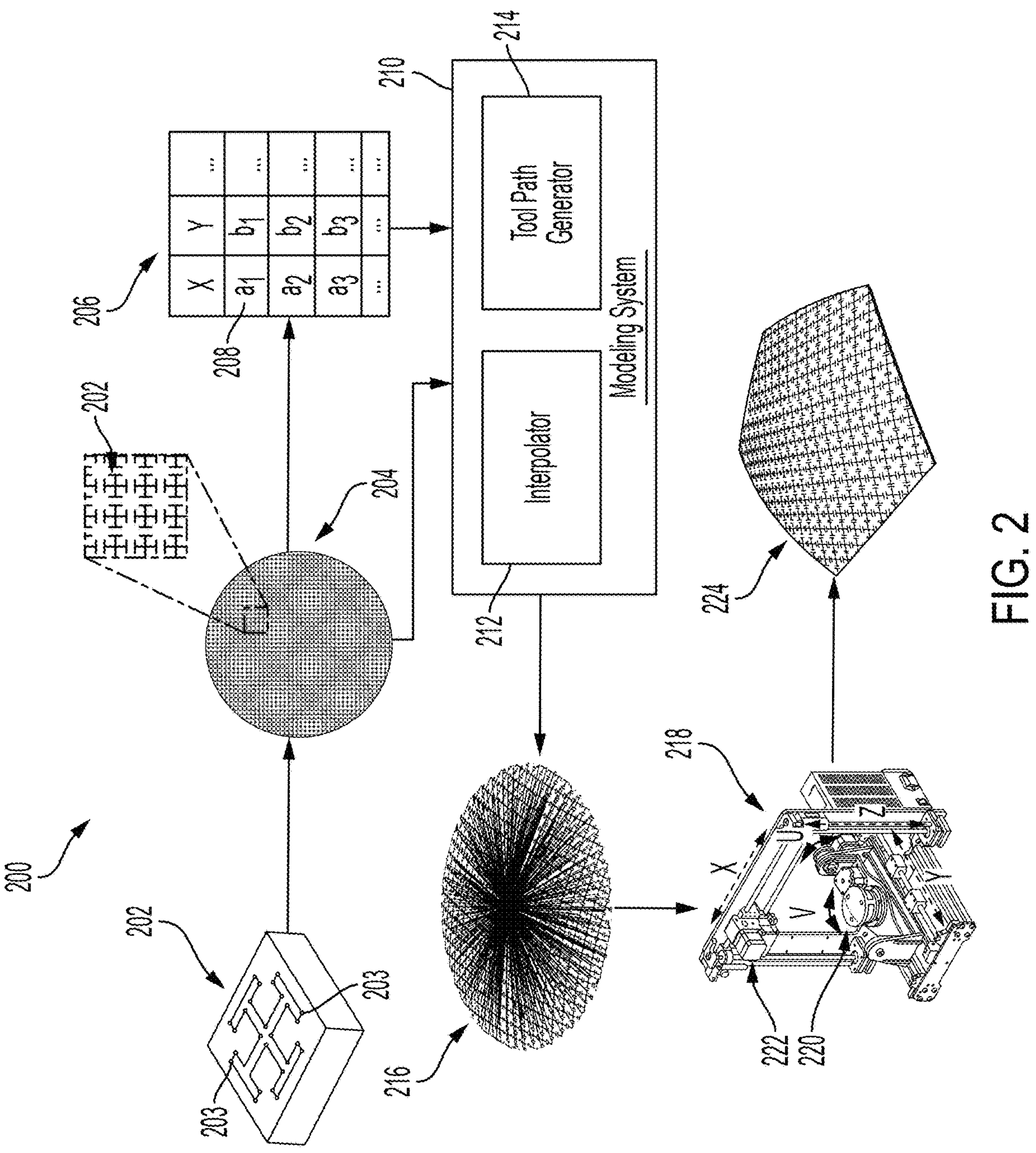
FIG. 2 illustrates an exemplary electrically enabled, nonplanar surface manufacturing system, in accordance with embodiments of the present disclosure.

FIG. 2 illustrates an exemplary electrically enabled, nonplanar surface manufacturing system, in accordance with embodiments of the present disclosure and generally referred to by reference numeral 200. At a high level, manufacturing system 200 generates electrically enabled, nonplanar surfaces. For example, manufacturing system 200 may generate frequency-selective, doubly curved selective surfaces. Manufacturing system 200 may implement additive manufacturing techniques, such that the electrically enabled, nonplanar surfaces are formed through the deposition of a material on a substrate. For example, manufacturing system 200 may include a multi-axis printer system, such as 5-axis printer system 218 discussed further below.

Generally, an electrically enabled, nonplanar surface generated by manufacturing system 200 is formed from unit cell 202. Unit cell 202 may be a repeatable structure or shape to form a patterned surface. Unit cell 202 may be generated via a computer-aided design (CAD) software, such as AUTOCAD, SOLIDWORKS, or similar CAD software. Unit cell 202 may be any number of shapes or structures that form a repeatable pattern. Examples of shapes for unit cell 202 include circular, square, triangular, rectangular, hexagonal, pentagonal, octagonal, oval, rhomboid, trapezoidal, parallelogrammatic, star-shaped, crescent-shaped, diamond-shaped, semicircular, elliptical, kite-shaped, cubic, and spherical. In some embodiments, unit cell 202 is cross-shaped.

In some embodiments, unit cell 202 is selectively designed for a predetermined electrically enabled surface. For example, unit cell 202 may be selectively shaped and/or sized to have one or more physical characteristics when patterned on a surface (as discussed further below). Exemplary physical characteristics that unit cell 202 may be selectively sized and/or shaped for include, but are not limited to, absorbance of a predetermined frequency range, reflectance of a predetermined frequency range, and similar characteristics.

Unit cell 202 is defined by vertices 203, where each vertex of unit cell 202 represents a point of connection of a plurality of lines (i.e., at least two lines) of unit cell 202. For example, if unit cell 202 is cross-shaped (as depicted in FIG. 2), vertices 203 may be placed between all pairs of lines connected at a right angle. As discussed further below, vertices 203 may correspond to Cartesian coordinates, where the Cartesian coordinates associated with vertices 203 define the two-dimensional structure of unit cell 202. The Cartesian coordinates associated with vertices 203 may then be used to overlay unit cell 202 on a nonplanar surface.

In some embodiments, manufacturing system 200 includes unit cell design 204. Broadly, unit cell design 204 may be a pattern of unit cells 202, where unit cell 202 is repeated over a portion or the span of unit cell design 204. For example, as depicted in FIG. 2, unit cell design 204 may be a plurality of unit cells (such as cross-shaped unit cell 202) laid end to end across a circular surface. For another example, unit cell design 204 may be a 2-dimensional array of unit cells. It is noted herein, however, that unit cell 202 need not be repeated across unit cell design 204, and unit cell design 204 may include a number of additional structures. Similarly to unit cell 202, unit cell design 204 may be constructed using any CAD software. Unit cell design 204 may be a variety of 2-dimensional shapes and sizes. For example, unit cell design 204 may be circular, square, triangular, rectangular, pentagonal, hexagonal, octagonal, oval, elliptical, rhomboid, trapezoidal, and other shapes.

Unit cell design 204 includes an origin point. In terms of (x, y) coordinates, the origin point may be a point arbitrarily defined as (0, 0). In some embodiments, unit cell design 204 may have a central origin point representing a general geometric center of the unit cell design 204. For example, if unit cell design 204 is circular, as depicted in FIG. 2, the origin point may be the center of the circle where every point of the circumference of unit cell design 204 is equidistant from the origin point. Defining the origin point as the center of unit cell design 204 may provide numerous advantages, including, but not limited to, compatibility and computational efficiency when printed by a printer system. For example, defining the origin point as the center of unit cell design 204 may enable more accurate alignment between unit cell design 204 and printing surface 220 discussed below.

In some embodiments, unit cell design 204 is a singular, continuous line. Put another way, unit cell design 204 may be designed such that the pattern and/or structures representing the unit cell design 204 are drawn with a continuous line without any breaks in the line. For example, adjacent unit cells 202 may be connected such that the end of one unit cell is the beginning of another unit cell. In some embodiments, the line of unit cell design 204 may begin at the origin point. Unit cell design 204 being a singular, continuous line may be advantageous. Specifically, unit cell design 204 formed of a singular, continuous line may allow for more computationally efficient generation of instructions for a tool path for unit cell design 204. Additionally, unit cell design 204, being formed of a singular, continuous line, may prevent distortion in printing a 2-dimensional, patterned surface on a 3-dimensional, non-planar object, as discussed further below.

In other embodiments, unit cell design 204 is formed from a plurality of lines. For example, a plurality of lines may collectively form unit cell design 204, where each vertex from vertices 203 of each unit cell 202 may represent the end of a first line and the start of a second line from the plurality of lines. For another example, a plurality of lines may collectively form unit cell design 204, where each unit cell 202 may be formed from an individual line from the plurality of lines.

In some embodiments, unit cell design 204 is converted to point cloud array 206. Point cloud array 206 includes one or more points 208 represented as a Cartesian coordinate. Each point from the one or more points 208 may represent a point of unit cell design 204. For example, each point from the one or more points 208 may be a location relative to an origin point, as represented by (x, y) values. For another example, the one or more points 208 may represent vertices 203 of unit cell 202. Each point from one or more points 208 may include additional information, including, but not limited to, material, draw order, intensity, a normal vector, a timestamp, reflectivity, a label, a start point indicator, an end point indicator, and color. The one or more points 208 from point cloud array 206 may be ordered. For example, point cloud array 206 may be ordered such that the origin point is the first point in the one or more points 208, followed by a point of a unit cell 202 adjacent to the origin point.

Unit cell design 204 and/or point cloud array 206 may be used by modeling system 210 for generating instructions for a tool path associated with an electrically enabled, nonplanar surface. At a high level, modeling system 210 overlays a 2-dimensional, electrically enabled surface on a 3-dimensional, nonplanar object and generates instructions for a tool path for printing the 2-dimensional, patterned surface on the 3-dimensional, nonplanar object. In some embodiments, manufacturing system 200 executes method 400 (as described below with regard to FIG. 4) for generating instructions for a tool path when point cloud array 206 is transmitted to modeling system 210. In other embodiments, manufacturing system 200 executes method 500 (as described below with regard to FIG. 5) for generating instructions for a tool path when unit cell design 204 is transmitted to modeling system 210.

In some embodiments, modeling system 210 includes interpolator 212. Interpolator 212 is a set of executable program code for interpolating unit cell design 204 and/or point cloud array 206 onto a predetermined, 3-dimensional object. Interpolator 212 may perform interpolation such that a curve is formed between each point from point cloud array 206 when point cloud array 206 is overlaid on the 3-dimensional object. The 3-dimensional object on which unit cell design 204 and/or point cloud array 206 is overlaid may be any shape, including a doubly curved surface. For example, the 3-dimensional object may be a sphere, ellipsoid, torus, hyperboloid, paraboloid, catenoid, helicoid, or any other similar shape. In some embodiments, the 3-dimensional object is a truncated icosahedron or polyhedron.

In some embodiments, when modeling system 210 receives unit cell design 204 and/or point cloud array 206, interpolator 212 executes method 500 as described below with regard to FIG. 5. For example, interpolator 212 may determine a polar coordinate for each coordinate of point cloud array 206 and/or unit cell design 204. By determining a polar coordinate for each coordinate received from point cloud array 206 and/or unit cell design 204, distortion during interpolation by interpolator 212 may be minimized compared to interpolation performed on nonpolar coordinates.

In some embodiments, modeling system 210 includes tool path generator 214. Tool path generator 214 is a set of executable program code for receiving an electrically enabled, nonplanar surface and generating instructions for a corresponding tool path for a multi-axis printer system. Accordingly, tool path generator 214 may receive an electrically enabled, nonplanar surface from interpolator 212 and generate instructions for tool path 216. Tool path 216 may be a set of sequential instructions for execution by a printer system, such as printer system 218, described below. Tool path 216 may include instructions for depositing material. For example, tool path 216 may include instructions for shuttering off or shuttering on, wherein a printer system executing tool path 216 does not move or deposit material when shuttering off, instead just moving to the next point. Tool path generator 214 may be a set of executable program code for performing method 600 depicted in FIG. 6 (discussed below) for generating instructions for a tool path. In some embodiments, tool path 216 may be specific to printer system 218 such that it is solely executable by printer system 218. In other embodiments, tool path 216 may be general such that it is executable by a plurality of printer systems.

Manufacturing system 200 includes printer system 218. Generally, printer system 218 may deposit material according to tool path 216, thereby forming electrically enabled, nonplanar surface 224. Printer system 218 may be any type of printer system, including, but not limited to, an aerosol jet printing system, a 3-dimensional printing system, an inkjet system, a droplet-based system, an extrusion-based deposition system, a laser-based system, a tip-based deposition system, or a similar manufacturing system. In some embodiments, printer system 218 is a 5-axis printer system. Exemplary axes for a 5-axis printer system are depicted in FIG. 2 as they relate to printer system 218. As depicted, printer system 218 may be movable horizontally, such as left-to-right across the X axis and front-to-back across the Y axis. Printer system 218 may also be moved vertically, such as up and down across the Z axis. Printer system 218 may also be moved rotationally, such as rotationally around the X axis as defined by the U axis or rotationally around the Y axis as defined by the V axis.

In some embodiments, printer system 218 includes printing surface 220. Printing surface 220 may receive deposition material. Printing surface 220 may be planar or nonplanar. For example, printing surface 220 may be a doubly curved surface such that material printed on printing surface 220 forms a doubly curved surface. Printing surface 220 may be formed from any material now known or later developed, including, but not limited to, a nonconductive material, a conductive material, metal, silicon, plastic, glass, rubber, or any other material or combination of materials. In some embodiments, printing surface 220 may be movable about one or more axes of printer system 218. For example, printing surface 220 may be movable in relation to the five axes of a 5-axis printer system. Any number of mechanisms may be utilized to move printing surface 220, including, but not limited to, motors, belts, rails, ball joints, wheels, or any other mechanism or combination of mechanisms.

In some embodiments, printer system 218 includes print head 222. Print head 222 may deposit one or more materials on printing surface 220 to form the electrically enabled, nonplanar surface corresponding to tool path 216. Accordingly, print head 222 may include at least one nozzle for depositing material. Any type of material may be deposited by print head 222 to form the electrically enabled, nonplanar surface corresponding to tool path 216, including, but not limited to, conductive ink, nonconductive ink, silver, copper, aluminum, plastic, gold, or any other material or combination of materials. In some embodiments, printing surface 220 may be movable about one or more axes of printer system 218, such as the five axes of a 5-axis printer system. Any number of mechanisms may be utilized for moving print head 222, including, but not limited to, motors, belts, rails, ball joints, wheels, or any other mechanism or combination of mechanisms.

Printer system 218 may be a part of manufacturing system 200 or remote from manufacturing system 200. In alternative embodiments, printer system 218 is a subtractive manufacturing system. For example, printer system 218 may be a CNC milling machine, CNC lathe, CNC router, electrical discharge machine (EDM), waterjet cutter, laser cutter, ultrasonic machining system, grinding machine, turning center, or hybrid CNC machine. Accordingly, printer system 218 may subtract from an original material to form electrically enabled, nonplanar surface 224.

As described above, the output of manufacturing system 200 may be electrically enabled, nonplanar surface 224. As described above, electrically enabled, nonplanar surface 224 may be a doubly curved surface such that each point of electrically enabled, nonplanar surface 224 curves in two directions with non-zero curvature. In some embodiments, electrically enabled, nonplanar surface 224 is an axisymmetric surface such that electrically enabled, nonplanar surface 224 is symmetrical about an axis. Electrically enabled, nonplanar surface 224 may be any shape, including, but not limited to, circular, square, triangular, rectangular, pentagonal, hexagonal, octagonal, oval, elliptical, rhomboid, trapezoidal, and other shapes. In some embodiments, electrically enabled, nonplanar surface 224 may be post-processed to form a structure. For example, electrically enabled, nonplanar surface 224 may be coupled with additional surfaces to form a polyhedron such as a truncated icosahedron. In some embodiments, as described above, electrically enabled, nonplanar surface 224 is a frequency-selective surface. In some embodiments, as described above, electrically enabled, nonplanar surface 224 is an electronic circuit.

Printing an Electrically Enabled, Nonplanar Surface

Figure 3:
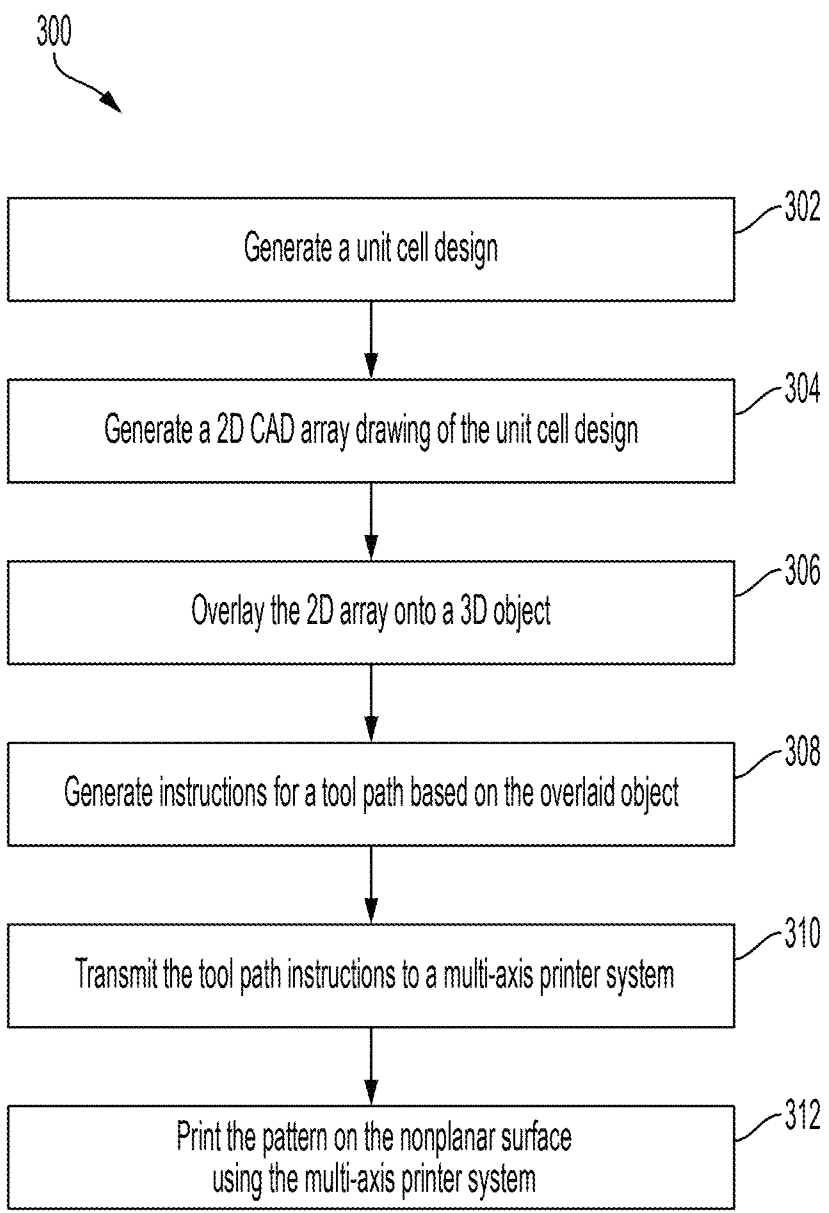
FIG. 3 illustrates an exemplary method flow chart for printing an electrically enabled, nonplanar surface, in accordance with embodiments of the present disclosure.

FIG. 3 illustrates an exemplary method flow chart for printing an electrically enabled, nonplanar surface in accordance with embodiments of the present disclosure and generally referred to by reference numeral 300. Broadly, method 300 prints a CAD design on a nonplanar surface. For example, the design may be printed on a flat surface. For another example, the design may be printed on a doubly curved surface, such as a sphere. The ability to print on a selected, nonplanar shape is advantageous, as the nonplanar shape of the surface may be selectively chosen to enhance or minimize the properties of the electrically enabled, nonplanar surface, such as the wavelength frequencies that the surface absorbs or reflects. Method 300 may be partially or fully performed by manufacturing system 200 discussed above. However, it is noted herein that method 300 is not limited to manufacturing system 200 described above and can be performed by any similar system.

In step 302, a unit cell design is generated. As described above, the unit cell may be designed by any CAD software now known or later developed. In some embodiments, the unit cell may be designed to have a selective set of properties, including size, shape, and thickness. As described with regard to unit cell 202, the unit cell may be repeatable as a pattern. Shapes contemplated for the unit cell include, but are not limited to, cross-shaped, triangular-shaped, square-shaped, hexagon-shaped, and other shapes or combinations of shapes. The unit cell may include one or more vertices, where the one or more vertices are intersection points between lines forming the unit cell design. For example, if the unit cell design is a triangle, the vertices of the unit cell design may be the three points of the triangle. The vertices may be used in further steps, such as step 306.

In step 304, a 2-dimensional CAD design drawing of the unit cell design is generated. The 2-dimensional CAD design may be selectively shaped to conform to the limitations of the printer system, such as printer system 218. For example, the unit cell design may be circular so as to fit under the print head (such as print head 222) of the printer system and not interfere with the physical elements of the printer system. In some embodiments, the 2-dimensional CAD design is selectively shaped to overlay a predetermined 3-dimensional object. For example, the 2-dimensional CAD design drawing shape may be circular for overlay of a sphere. In some embodiments, the 2-dimensional CAD drawing may be shaped to minimize distortion upon overlay on a 3-dimensional object.

As mentioned above, the unit cell design may be repeatable across a surface. As such, the 2-dimensional CAD design may be generated by duplicating the unit cell design. Accordingly, the plurality of unit cells may be connected to pattern a surface, such as a circle. In some embodiments, the 2-dimensional CAD design is formed from a singular, continuous line where the singular, continuous line connects each unit cell. Connecting the 2-dimensional CAD design with a singular, continuous line may be advantageous, as it may reduce computation complexity performed during tool path instruction generation, as discussed below.

In step 306, the 2-dimensional CAD design is overlaid onto a predetermined 3-dimensional object. As described further below with regard to method 500, a plurality of steps may be taken to overlay the 2-dimensional design onto the 3-dimensional object, including interpolation. For example, the Cartesian coordinates representing the 2-dimensional CAD design may be converted to polar coordinates and interpolated between. Converting each coordinate to a polar coordinate may be beneficial, as it may minimize distortion upon interpolation between coordinates while also reducing computational time and resource usage compared to other methods. Overlaying the 2-dimensional CAD design onto a 3-dimensional object is discussed further below with regard to FIG. 5. Upon overlaying the 2-dimensional CAD design onto a 3-dimensional object, an electrically enabled, nonplanar surface design is obtained.

In step 308, instructions for a tool path are generated based on the electrically enabled, nonplanar surface design. In some embodiments, the instructions for the tool path may include instructions for navigating the printer nozzle between points of the surface for printing. Accordingly, the printer nozzle may deposit material when moving between points of the surface. As described above, the overlaid object may include connecting lines between each end of a unit cell and the origin point of the object, where the origin point is the center of the object. Accordingly, to prevent the printer system from returning to the origin point (and possibly depositing material between the end of the unit cell and the origin point), the tool path may include instructions to shutter off, therefore instructing the printer system to skip instructions to return to center at the end of a unit cell. Accordingly, the printer system may then move to the start of the next unit cell. Shuttering off may be advantageous, as doing so eliminates redundant returns to the origin by the printer system, saving both computations and time. The generation of instructions for a tool path for a printer system is discussed more below as it relates to method 600 depicted in FIG. 6.

In step 310, the instructions for the tool path are transmitted to a multi-axis printer system. As described above, the multi-axis printer system may be any multi-axis printer system now known or later developed, including, but not limited to, a 3-axis printer system, a 5-axis printer system, a CNC machine, and any similar printing systems. In some embodiments, the instructions for the tool path are transmitted to the multi-axis printer system in a format that is compatible with the printer system such that the instructions for the tool path are executable. In other embodiments, the printer system receives the instructions for the tool path in an incompatible format and translates the instructions for the tool path to a compatible format.

In step 312, the design is printed on the nonplanar surface using the multi-axis printer system. Any printing technique may be utilized, including, but not limited to, additive manufacturing techniques. For example, the design may be printed on the nonplanar surface using aerosol inkjet technology. As described above, the electrically enabled, nonplanar surface may be further manufactured to enhance one or more properties of the surface or to attach the electrically enabled, nonplanar surface to additional elements, such as other printed conformal surfaces. In some embodiments, the electrically enabled, nonplanar surface is combined with additional electrically enabled, nonplanar surfaces to form a frequency-selective surface usable for a variety of applications, including electromagnetic and radar technologies.

Figure 4:
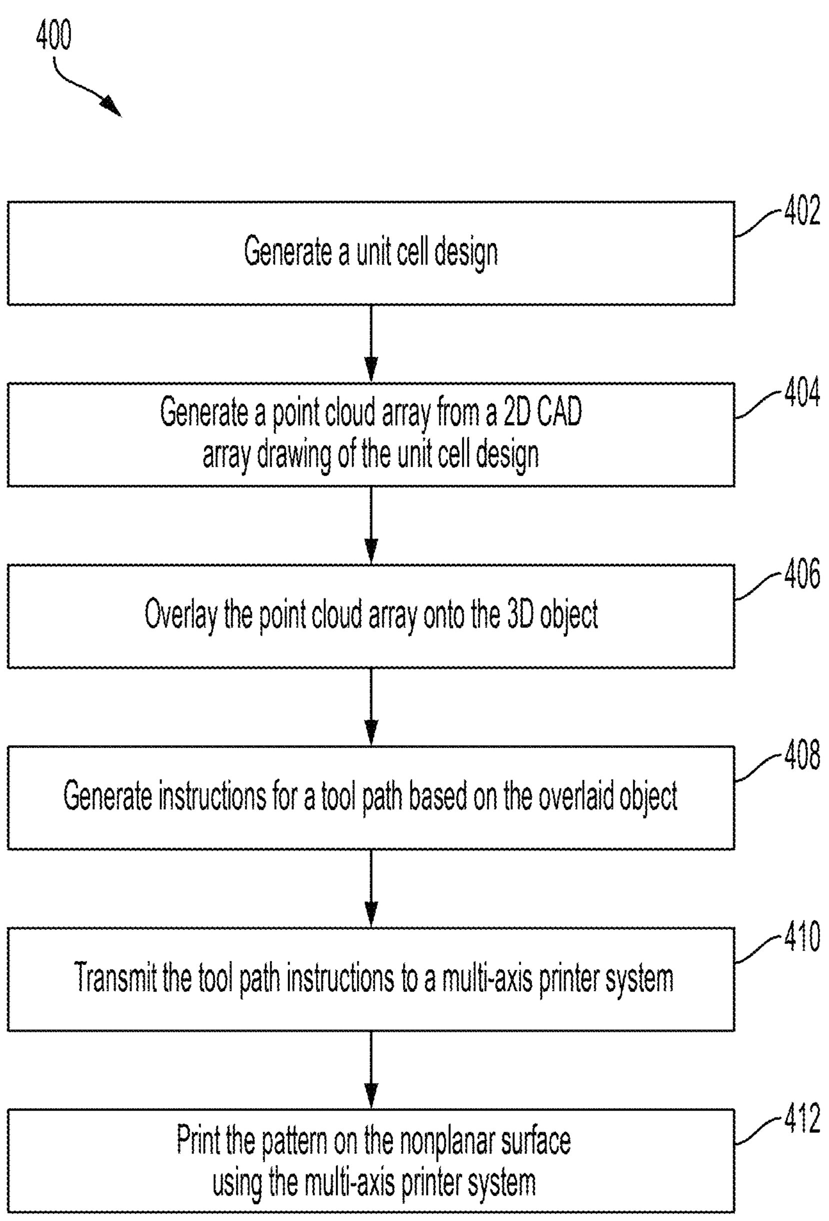
FIG. 4 illustrates an exemplary method flow chart for printing an electrically enabled, nonplanar surface, in accordance with embodiments of the present disclosure.

FIG. 4 illustrates an exemplary method flow chart for printing an electrically enabled, nonplanar surface, in accordance with embodiments of the present disclosure and generally referred to by reference numeral 400. Similarly to method 300 discussed above, method 400 prints a CAD design on a nonplanar surface. For example, a pattern for a frequency-selective surface may be printed on a doubly curved surface, such as a sphere. Method 400 may be partially or fully performed by manufacturing system 200, as discussed above. However, it is noted herein that method 400 is not limited to manufacturing system 200 described above and can be performed by any similar system. As described further below, method 400 includes substantially similar steps to the steps of method 300. However, method 400 differs from method 300 through the generation of a point cloud array, such as point cloud array 206 depicted in FIG. 2.

In step 402, in a substantially similar manner to step 302 described above with regard to FIG. 3, a unit cell design is generated. For example, a unit cell design may be generated via CAD software, where the unit cell is a pentagon. Subsequent to the generation of the unit cell design, in some embodiments, the unit cell design may be formed into a 2-dimensional CAD design. For example, a pentagon-shaped unit cell may be utilized to form a 2-dimensional CAD design, where the 2-dimensional CAD design is a tessellation of pentagon-shaped unit cells. In such embodiments, the 2-dimensional CAD design may include a singular, continuous line, where all points of the 2-dimensional CAD design are connected by the singular, continuous line. In other embodiments, subsequent to the generation of the unit cell design, method 400 proceeds to step 404 without the generation of a 2-dimensional CAD design.

In step 404, a point cloud array is generated from a 2-dimensional CAD design drawing of the unit cell design. The point cloud array generated may be substantially similar to point cloud array 206 depicted in FIG. 2, where the point cloud array represents a plurality of unit cells repeated across a 2-dimensional surface to form a patterned surface. For example, the point cloud array may include locational coordinates of the vertices of a plurality of unit cells, where each vertex represents a joining point of two adjacent lines of a unit cell. In some embodiments, the point cloud array may include a plurality of lines rather than a singular, continuous line. The point cloud array including a plurality of lines may be advantageous, as it may increase computational efficiency when generating an array of unit cells patterned across the array by eliminating the computational steps required to connect all points of the array with a singular, continuous line.

In step 406, the point cloud array is overlaid onto a 3-dimensional object, such as a doubly curved surface. While step 406 utilizes a point cloud array as opposed to a 2-dimensional CAD design, step 406 may be substantially similar to step 306 described above with regard to FIG. 3. For example, step 406 may translate points in the point cloud array to polar coordinates and interpolate between the polar coordinates when overlaying the point cloud array onto the 3-dimensional object. The interpolation performed in step 406 may be performed according to method 500 described below with regard to FIG. 5. Upon overlay of the point cloud array onto the 3-dimensional object, step 406 may produce a surface, where the surface may be used to generate instructions for a tool path.

In step 408, instructions for a tool path are generated based on the point cloud array as interpolated on the associated 3-dimensional object. Step 408 may be substantially related to step 308, as described above with regard to FIG. 3. The instructions for the tool path generated in step 408 may include one or more shutter-off instructions. The instructions may instruct the multi-axis printer system to move between two surface points. Further, the instructions may instruct the multi-axis printer to deposit material between the two surface points. One or more shutter-off instructions may be instructions for the multi-axis printer system to skip the next instruction and, therefore, not move between two points and/or deposit material between two points. Further, the one or more shutter-off instructions may be instructions for the multi-axis printer system to proceed to the next point.

In step 410, in a substantially similar manner to step 310 described above with regard to FIG. 3, the instructions for the tool path are transmitted to a multi-axis printer system. As described above, the multi-axis printer system may be a 5-axis printer system, such as printer system 218 depicted in FIG. 2. The instructions for the tool path may be generated to account for one or more physical constraints of the 5-axis printer system, such as the distance between the print head and the printing surface of the printer system. In step 412, in a substantially similar manner to step 312 described above with regard to FIG. 3, the design of the point cloud array is printed on the nonplanar surface using the multi-axis printer system. Put another way, the multi-axis printer system executes the instructions of the tool path, where the instructions relate to the printing of the overlaid object. For example, the pattern represented by the point cloud array may be printed on a spherical surface, where the distortion of the pattern as printed on the spherical surface is minimized, due to the interpolation process described above with regard to step 406 and below with regard to method 500.

Electrically Enabled, Nonplanar Surface Interpolation

Figure 5:
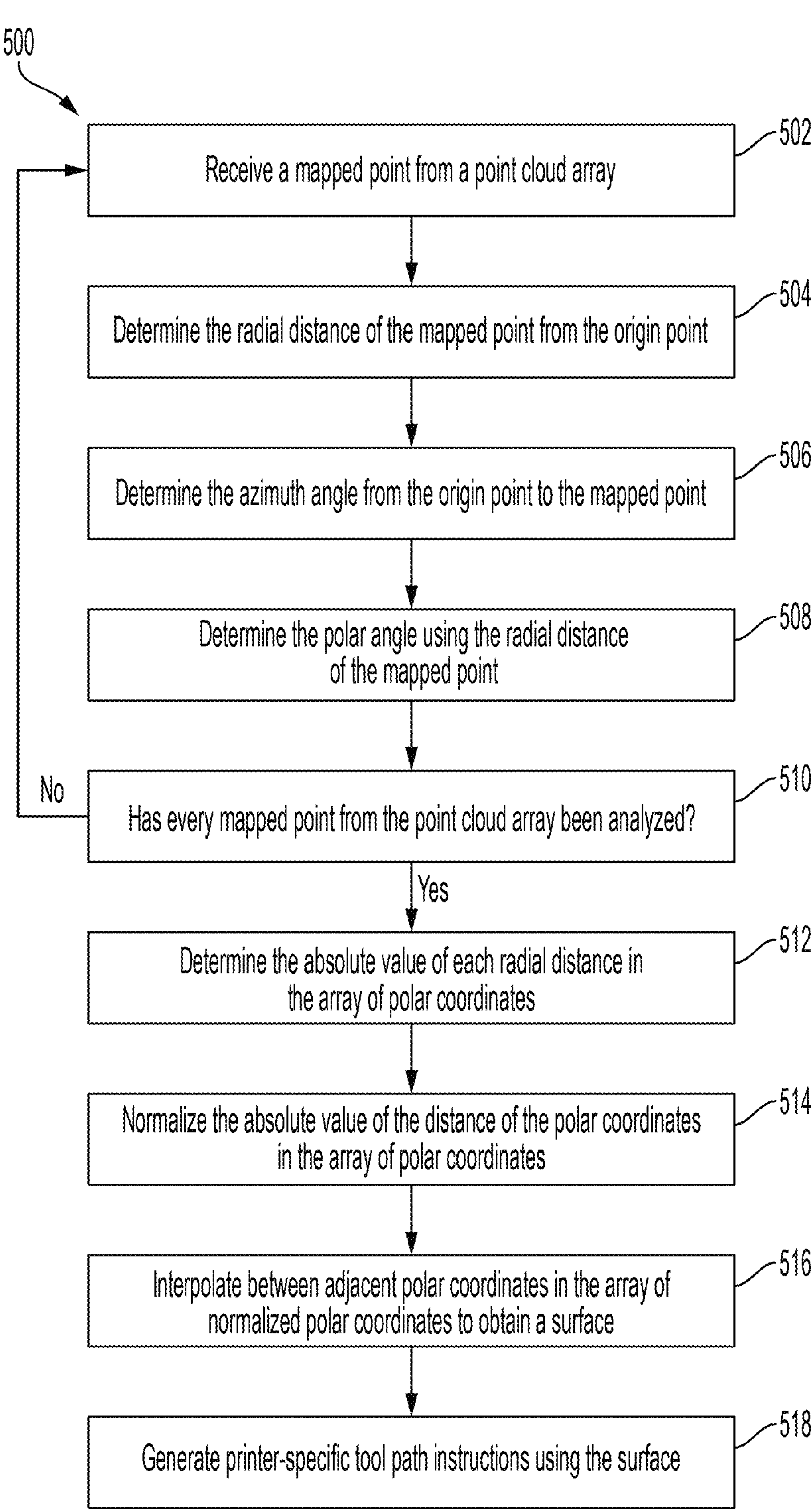
FIG. 5 illustrates an exemplary method flow chart for overlaying a pattern on a nonplanar surface, in accordance with embodiments of the present disclosure.

FIG. 5 illustrates an exemplary method flow chart for overlaying a design on a nonplanar surface, in accordance with embodiments of the present disclosure and generally referred to by reference numeral 500. At a high level, overlaying a design on a nonplanar surface includes mapping points of a point cloud array to corresponding points of a 3-dimensional object and interpolating between adjacent surface points of the mapped 3-dimensional object. Method 500 includes converting mapped coordinates to polar coordinates, normalizing the polar coordinates, and interpolating between the normalized polar coordinates. For example, method 500 may convert between (x, y, z) Cartesian coordinates and polar coordinates, where the polar coordinates include radial distance, polar angle, and azimuthal angle coordinates, represented by (r, θ, φ), respectively. Interpolating between polar coordinates of doubly curved surfaces is advantageous, as it minimizes the distortion of designs overlaid across doubly curved surfaces as compared to interpolating between Cartesian coordinates of doubly curved surfaces. In some embodiments, method 500 is partially or completely performed by interpolator 212 depicted in FIG. 2; however, it is noted herein that alternative interpolator engines may perform method 500.

In step 502, a mapped point from a point cloud is received, such as by an interpolator. For example, a point from a point cloud array may be received by interpolator 212. As discussed above, a point cloud array, such as point cloud array 206, may include one or more points. The one or more points may represent the vertices of a plurality of unit cells in a 2-dimensional unit cell design. As such, the one or more points of the point cloud array may represent the entire unit cell design. In some embodiments, the point cloud array includes an origin point, where the origin point is the center of the shape. In an ordered point cloud array, the origin point may be the first point received by an interpolator. It is noted herein that step 502 may alternatively include receiving a point from a 2-dimensional unit cell, as described above in relation to unit cell design 204 and interpolator 212 depicted in FIG. 2. In such embodiments, the interpolator may receive the first point on a line forming the 2-dimensional design.

Generally, the point from the point cloud array is received as a mapped point, where the mapped point is mapped to a corresponding point on the surface of a 3-dimensional object. For example, a mapped point may be a vertex of a single unit cell design overlaid on a sphere. The location of the mapped point may be represented by a 3-dimensional Cartesian coordinate (x, y, z). In some embodiments, the origin point of the corresponding 3-dimensional object on which the point cloud array is overlaid is the center of the surface of the 3-dimensional object and therefore represented as (0, 0, 0). Accordingly, the origin point of the point cloud array may be mapped to the origin point of the 3-dimensional object.

In step 504, the radial distance of the mapped point from the origin point is determined. The radial distance refers to the distance between the mapped point and the origin point in a 3-dimensional space. Accordingly, the radial distance of the mapped point to the origin point may be determined by measuring the length of a straight line connecting the mapped point and the origin point in the 3-dimensional space (e.g., the radial line). The radial distance of the mapped point may be represented by r. In step 506, an azimuth angle from the origin point to the mapped point is determined. The azimuth angle may be the angle of rotation of a line connecting the mapped point to the origin point around a given polar axis, such as the X-Y axis. As such, the radial line of the mapped point from the origin point may be used to determine the azimuth angle of the mapped point in relation to the origin point. The azimuth angle of the mapped point may be represented by q.

In step 508, A polar angle is determined using the radial distance of the mapped point from the origin point, as determined in step 504. The polar angle is the angle between the radial line and a given polar axis, where the radial line is the line of the radial distance of the mapped point relative to the origin point, as discussed in step 504. The polar angle of the mapped point may be represented by θ. In step 510, it is determined whether every mapped point from the point cloud array has been analyzed. If there are more mapped points to be analyzed, method 500 proceeds back to step 502. If all mapped points in the point cloud array have been analyzed, method 500 proceeds to step 512. Accordingly, an array of polar coordinates representing the mapped point cloud array is obtained, where each polar coordinate is represented by (r, θ, φ).

In step 512, the absolute value of each radial distance in the array of polar coordinates is determined. For example, if a radial distance of a polar coordinate is −8, the absolute value of the radial distance of the polar coordinate is determined to be 8. The absolute value of each radial distance in the array of polar coordinates may be used in further steps of method 500, including step 514. In step 514, the absolute value of the radial distance of the polar coordinates in the array of polar coordinates is normalized. Normalizing the polar coordinates may first involve determining the coordinates with the minimum and maximum radial distance values in the array of polar coordinates. Upon determining the coordinates with the minimum and maximum radial distance values, a selected range may be applied across the radial distances of the polar coordinates, where the range extends from the one or more polar coordinates with the maximum radial distance value to the one or more polar coordinates with the minimum radial distance value. Accordingly, the minimum and maximum radial distances may be assigned values selectively. For example, the minimum radial distance value may be assigned a value of 0, whereas the maximum radial distance value may be assigned a value of 1000. Accordingly, the remaining coordinates may be assigned values in relation to the endpoints of the range. In some embodiments, the range is selectively chosen to increase or decrease the precision of the interpolation performed in step 516.

In step 516, interpolation is performed on the array of normalized polar coordinates to obtain a surface. Any number of interpolation techniques may be used to interpolate the array of normalized polar coordinates, including, but not limited to, linear interpolation and bilinear interpolation. In step 518, instructions for a printer-specific tool path are generated using the surface. Broadly, the instructions for the printer-specific tool path may instruct a printer system to deposit material on a printer surface in the design associated with the surface obtained through interpolation. In some embodiments, instructions for a printer-specific tool path are generated using method 600 as described below with regard to FIG. 6. For example, the instructions for the printer-specific tool path may be generated by generating instructions moving the nozzle of a printer system between points on the surface and depositing material accordingly.

Figure 6:
FIG. 6 illustrates an exemplary method flow chart for generating instructions for a tool path, in accordance with embodiments of the present disclosure.
Figure 6:
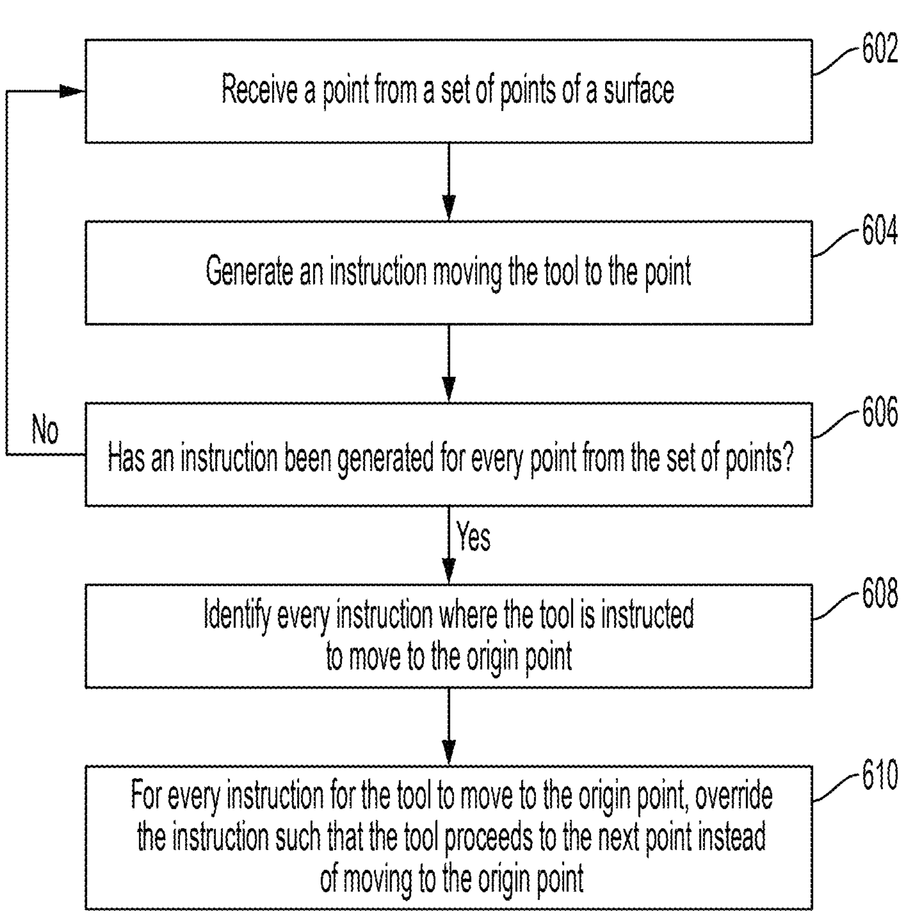

Generating Instructions for an Electrically Enabled, Non-planar Surface Tool Path FIG. 6 illustrates an exemplary method flow chart for generating instructions for a tool path, in accordance with embodiments of the present disclosure and generally referred to by reference numeral 600. Broadly, method 600 generates instructions for a printer-specific tool path based on a received surface, such as a surface received from an interpolator. For example, method 600 may generate instructions for a tool path for printing an electrically enabled, nonplanar surface using a 5-axis printer system, such as printer system 218. Method 600 may generate instructions for a tool path that optimize computational efficiency and reduce printing error by removing redundant movements. In some embodiments, method 600 is performed entirely or in part by modeling system 210 depicted in FIG. 2. However, it is contemplated that method 600 may be performed entirely or in part by another system.

In step 602, a point from a set of points is received. The set of points corresponds to a surface obtained through the interpolation of polar coordinates, such as is obtained by method 500 described above with respect to FIG. 5. For example, the surface may correspond to a doubly curved surface overlaid with a pattern of cross-shaped unit cells, as depicted with regard to electrically enabled, nonplanar surface 224. Accordingly, the set of points may represent the entirety of the design of cross-shaped unit cells as overlaid on the nonplanar surface. In some embodiments, the set of points is a singular, continuous line, where a point is a location on the singular, continuous line. For example, the endpoint on the line may be the origin point of the surface. In such embodiments, the line may return to an origin point of the surface (as described above with regard to method 500) between a first point representing the end of a first unit cell and a second point representing the start of a second unit cell.

In step 604, an instruction is generated for moving the tool to the point. For example, an instruction may be generated to move the tool from a first point to a second point. To illustrate, if the point is the starting point of a unit cell and the tool is located at the origin point, an instruction may be generated to move the point from the origin point to the starting point. Accordingly, if a subsequent point is received, an instruction may be generated for moving the tool from the starting point of the unit cell to the subsequent point. The tool may be any movable mechanism of the printer system, including, but not limited to, the print head (such as print head 222), the printing surface (such as printing surface 220), a combination of the print head and printing surface, or any other component of the printer system.

In some embodiments, an instruction to move the tool to the coordinate may further include an instruction for the printer system to deposit material in a predetermined pattern. For example, the instruction to move from a first point to a second point may include an instruction for a nozzle to deposit a material at a predetermined rate while moving the tool from the first point to the second point. For another example, the instruction to move from a first point to a second point may include an instruction for a nozzle to deposit a material in a predetermined pattern upon reaching the second point. It is noted herein that instructions may be generated to move the tool from the endpoint of a unit cell back to the origin point, rather than moving the tool directly to the start of the next unit cell from the endpoint of the unit cell. Accordingly, further steps in method 600 may address redundant instructions, such as moving the tool back to the origin point after each unit cell endpoint.

In step 606, it is determined whether an instruction has been generated for every point of the set of points. If an instruction has not been generated for every point, method 600 proceeds back to step 602. If an instruction has been generated for every point from the set of points, method 600 proceeds to step 608. In step 608, every instruction where the tool is instructed to move to the origin point is identified. For example, if an instruction moves the tool from a first point to a second point, where the second point is the origin point, the instruction may be identified as an instruction to move to the origin point. As described above, instructions to move to the origin point may be redundant, thus resulting in computational inefficiency. Additionally, if accompanied by instructions to deposit material, instructions to move to the origin point may result in the erroneous deposition of material relative to the electrically enabled, nonplanar surface.

In step 610, for every instruction identified in step 608, the instruction is overridden such that the tool proceeds to the next coordinate instead of moving to the origin point. In some embodiments, the identified instructions are replaced with overriding instructions to shutter off. For example, a shutter off instruction may instruct the printer system not to execute an instruction to move to the origin point and instead proceed to the point following the origin point. Additionally, a shutter off instruction may instruct the printer system not to execute an instruction depositing material between a point and the origin point. In other embodiments, the identified instructions to move to the origin point are removed, and no replacement instructions are generated. Upon overriding the instructions to move to the origin point, instructions for a tool path are obtained, where the tool does not move back to the origin point between unit cells. As described above, overriding the instructions to return to the origin point and/or deposit material between a point and the origin point may reduce redundancies and erroneous deposition of material, thereby increasing computational efficiency and accuracy.

Features described above as well as those claimed below may be combined in various ways without departing from the scope hereof. The following examples illustrate some possible, non-limiting combinations:

Clause 1. A system for generating instructions for a tool path for an electrically enabled, doubly curved surface, the system comprising: one or more non-transitory computer-readable media storing computer-executable instructions that, when executed by at least one processor, perform a method for generating the instructions for the tool path for the electrically enabled, doubly curved surface, the method comprising: generating a 2-dimensional design of a unit cell design; generating a point cloud array associated with the 2-dimensional design of the unit cell design, wherein the point cloud array comprises a plurality of points; generating the electrically enabled, doubly curved surface associated with the point cloud array, wherein generating the electrically enabled, doubly curved surface comprises: determining a polar coordinate for each point of the plurality of points from the point cloud array such that a set of polar coordinates is obtained; determining an absolute value of a radial distance of each polar coordinate from the set of polar coordinates; normalizing the absolute value of the radial distance of each polar coordinate from the set of polar coordinates to obtain a set of normalized polar coordinates;

and interpolating the set of normalized polar coordinates to obtain the electrically enabled, doubly curved surface; and generating the instructions for the tool path associated with the electrically enabled, doubly curved surface.

Clause 2. The system of clause 1, further comprising: a 5-axis printer system operable to print the electrically enabled, doubly curved surface through deposition of a material on a printing surface, wherein the printing surface comprises a tool movable about five axes, the tool being at least one of the printing surface or a print head; and wherein the method further comprises: executing, via the 5-axis printer system, the instructions for the tool path, wherein the instructions comprise an instruction for a movement of the tool.

Clause 3. The system of clause 1 or clause 2, wherein the instructions of the tool path further comprise a shutter-off instruction preventing execution of the instruction for the movement of the tool.

Clause 4. The system of any of clause 1 through clause 3, wherein generating the instructions for the tool path associated with the electrically enabled, doubly curved surface comprises: generating a plurality of instructions by at least: for each point in a set of points of the electrically enabled, doubly curved surface, generating an instruction to move a tool of a printer system to the point; identifying at least one instruction from the plurality of instructions moving the tool of the printer system to a predefined origin point; and responsive to identifying the at least one instruction, overriding the at least one instruction from the plurality of instructions.

Clause 5. The system of any of clause 1 through clause 4, wherein overriding the at least one instruction from the plurality of instructions comprises: removing the at least one instruction from the plurality of instructions.

Clause 6. The system of any of clause 1 through clause 5, wherein determining the polar coordinate for each point of the plurality of points comprises: determining the radial distance, an azimuth angle, and a polar angle for each point of the plurality of points, wherein each point from the plurality of points is converted to the polar coordinate from a Cartesian coordinate.

Clause 7. The system of any of clause 1 through clause 6, wherein the radial distance for each point of the plurality of points is based on a radial line between said point and an origin point, where the origin point is a center point of the electrically enabled, doubly curved surface.

Clause 8. One or more non-transitory computer-readable media storing computer-executable instructions that, when executed by at least one processor, perform a method for generating instructions for a tool path for an electrically enabled, doubly curved surface, the method comprising: generating a 2-dimensional design of a unit cell design, wherein the 2-dimensional design comprises a plurality of points along a singular line; generating the electrically enabled, doubly curved surface associated with the 2-dimensional design, wherein generating the electrically enabled, doubly curved surface comprises: determining a polar coordinate for each point of the plurality of points from the 2-dimensional design such that a set of polar coordinates is obtained; determining an absolute value of a radial distance of each polar coordinate from the set of polar coordinates; normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

Clause 9. The one or more non-transitory computer-readable media of clause 8, wherein generating the instructions for the tool path associated with the electrically enabled, doubly curved surface comprises: obtaining the instructions by at least: for each point in a set of points of the electrically enabled, doubly curved surface, generating an instruction to at least one of: deposit ink between the point and an adjacent point in the set of points; or move a tool of a printer system to the point.

Clause 10. The one or more non-transitory computer-readable media of clause 8 or clause 9, wherein generating the instructions for the tool path associated with the electrically enabled, doubly curved surface further comprises: identifying at least one instruction from the instructions where the adjacent point is a predefined origin point; and responsive to identifying the at least one instruction, generating a shutter off instruction such that the tool of the printer system is prevented from depositing the ink between the point and the predefined origin point.

Clause 11. The one or more non-transitory computer-readable media of any of clause 8 through clause 10, wherein generating the 2-dimensional design of the unit cell design further comprises: selectively designing the 2-dimensional design to reflect a predetermined range of frequencies when printed on a nonplanar surface.

Clause 12. The one or more non-transitory computer-readable media of clause 8, wherein the method further comprises: transmitting the instructions for the tool path to a multi-axis printer system, wherein the multi-axis printer system is operable to execute the instructions for the tool path to print the electrically enabled, doubly curved surface on a curved printing surface of the multi-axis printer system.

Clause 13. The one or more non-transitory computer-readable media of any of clause 8 through clause 12, wherein the instructions for the tool path comprise: a shutter-off instruction such that the multi-axis printer system overrides a subsequent instruction based on the shutter-off instruction.

Clause 14. The one or more non-transitory computer-readable media of any of clause 8 through clause 14, wherein the subsequent instruction comprises a print head of the multi-axis printer system returning to an origin point of the electrically enabled, doubly curved surface.

Clause 15. A method for generating instructions for a tool path for an electrically enabled, doubly curved surface, the method comprising: generating a 2-dimensional design of a unit cell design; generating a point cloud array associated with the 2-dimensional design of the unit cell design, wherein the point cloud array comprises a plurality of points; generating the electrically enabled, doubly curved surface associated with the point cloud array, wherein generating the electrically enabled, doubly curved surface comprises: determining a polar coordinate for each point of the plurality of points from the point cloud array such that a set of polar coordinates is obtained; determining an absolute value of a radial distance of each polar coordinate from the set of polar coordinates; normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

Clause 16. The method of clause 15, wherein generating the 2-dimensional design of the unit cell design comprises: generating a repeatable pattern of the unit cell design across the 2-dimensional design, wherein the unit cell design is selectively shaped to reflect a predetermined range of frequencies.

Clause 17. The method of clause 15 or clause 16, wherein interpolating the set of normalized polar coordinates to obtain the electrically enabled, doubly curved surface comprises: performing at least one of linear interpolation or bilinear interpolation of the set of normalized polar coordinates across a sphere.

Clause 18. The method of any of clause 15 through clause 17, further comprising: wherein a shape of the 2-dimensional design of the unit cell design is selectively chosen for compatibility with one or more tools of a multi-axis printer system, wherein the shape of the 2-dimensional design of the unit cell design is circular.

Clause 19. The method of any of clause 15 through clause 18, wherein the point cloud array is ordered such that an origin point of the point cloud array is a first point in the point cloud array, wherein the origin point is a central point of the 2-dimensional design of the unit cell design.

Clause 20. The method of any of clause 15 through clause 19, further comprising: printing, via a multi-axis printer system, a plurality of frequency selective surfaces, including the electrically enabled, doubly curved surface based on the instructions for the tool path to obtain a plurality of printed frequency selective surfaces; and coupling the plurality of printed frequency selective surfaces together to form a truncated icosahedron.

Although the present disclosure has been described with reference to the embodiments illustrated in the attached drawing figures, it is noted that equivalents may be employed and substitutions made herein without departing from the scope of the present disclosure as recited in the claims.

Having thus described various embodiments of the present disclosure, what is claimed as new and desired to be protected by Letters Patent includes the following:

1. A system for generating instructions for a tool path for an electrically enabled, doubly curved surface, the system comprising:

at least one processor; and one or more non-transitory computer-readable media storing computer-executable instructions that, when executed by the at least one processor, perform a method for generating the instructions for the tool path for the electrically enabled, doubly curved surface, the method comprising:

generating a 2-dimensional design of a unit cell design;

generating a point cloud array associated with the 2-dimensional design of the unit cell design, wherein the point cloud array comprises a plurality of points;

generating the electrically enabled, doubly curved surface associated with the point cloud array, wherein generating the electrically enabled, doubly curved surface comprises:

determining a polar coordinate for each point of the plurality of points from the point cloud array such that a set of polar coordinates is obtained;

determining an absolute value of a radial distance of each polar coordinate from the set of polar coordinates;

normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

2. The system of claim 1, further comprising:

a 5-axis printer system operable to print the electrically enabled, doubly curved surface through deposition of a material on a printing surface, wherein the printing surface comprises a tool movable about five axes, the tool being at least one of the printing surface or a print head; and wherein the method further comprises:

executing, via the 5-axis printer system, the instructions for the tool path, wherein the instructions comprise an instruction for a movement of the tool.

3. The system of claim 2, wherein the instructions for the tool path further comprise a shutter-off instruction preventing execution of the instruction for the movement of the tool.

4. The system of claim 1, wherein generating the instructions for the tool path associated with the electrically enabled, doubly curved surface comprises:

generating the instructions by at least:

for each point in a set of points of the electrically enabled, doubly curved surface, generating an instruction to move a tool of a printer system to the point;

identifying at least one instruction from the instructions moving the tool of the printer system to a predefined origin point; and responsive to identifying the at least one instruction, overriding the at least one instruction from the instructions.

5. The system of claim 4, wherein overriding the at least one instruction from the instructions comprises:

removing the at least one instruction from the instructions.

6. The system of claim 1, wherein determining the polar coordinate for each point of the plurality of points comprises:

determining the radial distance, an azimuth angle, and a polar angle for each point of the plurality of points, wherein each point from the plurality of points is converted to the polar coordinate from a Cartesian coordinate.

7. The system of claim 6, wherein the radial distance for each point of the plurality of points is based on a radial line between said point and an origin point, where the origin point is a center point of the electrically enabled, doubly curved surface.

8. One or more non-transitory computer-readable media storing computer-executable instructions that, when executed by at least one processor, perform a method for generating instructions for a tool path for an electrically enabled, doubly curved surface, the method comprising:

generating a 2-dimensional design of a unit cell design, wherein the 2-dimensional design comprises a plurality of points along a singular line;

generating the electrically enabled, doubly curved surface associated with the 2-dimensional design, wherein generating the electrically enabled, doubly curved surface comprises:

determining a polar coordinate for each point of the plurality of points from the 2-dimensional design such that a set of polar coordinates is obtained;

determining an absolute value of a radial distance of each polar coordinate from the set of polar coordinates;

normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

9. The one or more non-transitory computer-readable media of claim 8, wherein generating the instructions for the tool path associated with the electrically enabled, doubly curved surface comprises:

obtaining the instructions by at least:

for each point in a set of points of the electrically enabled, doubly curved surface, generating an instruction to at least one of:

deposit ink between the point and an adjacent point in the set of points; or move a tool of a printer system to the point.

10. The one or more non-transitory computer-readable media of claim 9, wherein generating the instructions for the tool path associated with the electrically enabled, doubly curved surface further comprises:

identifying at least one instruction from the instructions where the adjacent point is a predefined origin point; and responsive to identifying the at least one instruction, generating a shutter off instruction such that the tool of the printer system is prevented from depositing the ink between the point and the predefined origin point.

11. The one or more non-transitory computer-readable media of claim 8, wherein generating the 2-dimensional design of the unit cell design further comprises:

selectively designing the 2-dimensional design to reflect a predetermined range of frequencies when printed on a nonplanar surface.

12. The one or more non-transitory computer-readable media of claim 8, wherein the method further comprises:

transmitting the instructions for the tool path to a multi-axis printer system, wherein the multi-axis printer system is operable to execute the instructions for the tool path to print the electrically enabled, doubly curved surface on a curved printing surface of the multi-axis printer system.

13. The one or more non-transitory computer-readable media of claim 12, wherein the instructions for the tool path comprise:

a shutter-off instruction such that the multi-axis printer system overrides a subsequent instruction based on the shutter-off instruction.

14. The one or more non-transitory computer-readable media of claim 13, wherein the subsequent instruction comprises a print head of the multi-axis printer system returning to an origin point of the electrically enabled, doubly curved surface.

15. A method for generating instructions for a tool path for an electrically enabled, doubly curved surface, the method comprising:

generating a 2-dimensional design of a unit cell design;

generating a point cloud array associated with the 2-dimensional design of the unit cell design, wherein the point cloud array comprises a plurality of points;

generating the electrically enabled, doubly curved surface associated with the point cloud array, wherein generating the electrically enabled, doubly curved surface comprises:

determining a polar coordinate for each point of the plurality of points from the point cloud array such that a set of polar coordinates is obtained;

determining an absolute value of a radial distance of each polar coordinate from the set of polar coordinates;

normalizing the absolute value of the radial distance of each polar coordinate from the set of polar coordinates to obtain a set of normalized polar coordinates; and interpolating the set of normalized polar coordinates to obtain the electrically enabled, doubly curved surface; and generating the instructions for the tool path associated with the electrically enabled, doubly curved surface.

16. The method of claim 15, wherein generating the 2-dimensional design of the unit cell design comprises:

generating a repeatable pattern of the unit cell design across the 2-dimensional design, wherein the unit cell design is selectively shaped to reflect a predetermined range of frequencies.

17. The method of claim 16, wherein interpolating the set of normalized polar coordinates to obtain the electrically enabled, doubly curved surface comprises:

performing at least one of linear interpolation or bilinear interpolation of the set of normalized polar coordinates across a sphere.

18. The method of claim 17, further comprising:

wherein a shape of the 2-dimensional design of the unit cell design is selectively chosen for compatibility with one or more tools of a multi-axis printer system, wherein the shape of the 2-dimensional design of the unit cell design is circular.

19. The method of claim 15, wherein the point cloud array is ordered such that an origin point of the point cloud array is a first point in the point cloud array, wherein the origin point is a central point of the 2-dimensional design of the unit cell design.

20. The method of claim 15, further comprising:

printing, via a multi-axis printer system, a plurality of frequency selective surfaces, including the electrically enabled, doubly curved surface based on the instructions for the tool path to obtain a plurality of printed frequency selective surfaces; and coupling the plurality of printed frequency selective surfaces together to form a truncated icosahedron.

* * * * *